US006493723B1

United States Patent
Busche

(10) Patent No.: US 6,493,723 B1
(45) Date of Patent: Dec. 10, 2002

(54) METHOD AND SYSTEM FOR INTEGRATING SPATIAL ANALYSIS AND DATA MINING ANALYSIS TO ASCERTAIN WARRANTY ISSUES ASSOCIATED WITH TRANSPORTATION PRODUCTS

(75) Inventor: Frederick D. Busche, Highland Village, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/401,109

(22) Filed: Sep. 22, 1999

(51) Int. Cl.$^7$ .............................................. G06F 17/30
(52) U.S. Cl. ................................................... 707/104.1
(58) Field of Search ..................................... 707/104.1

(56) References Cited

U.S. PATENT DOCUMENTS

| | | | | |
|---|---|---|---|---|
| 5,475,597 A | * | 12/1995 | Buck | 340/438 |
| 5,836,529 A | * | 11/1998 | Gibbs | 246/122 R |
| 5,845,255 A | * | 12/1998 | Mayaud | 705/3 |
| 5,966,126 A | * | 10/1999 | Szabo | 345/762 |
| 5,987,470 A | * | 11/1999 | Meyers et al. | 707/102 |
| 5,991,735 A | * | 11/1999 | Gerace | 705/1 |
| 6,012,045 A | * | 1/2000 | Barzilai et al. | 283/67 |
| 6,278,994 B1 | * | 8/2001 | Fuh et al. | 707/102 |
| 6,289,276 B1 | * | 9/2001 | Ahrens et al. | 701/200 |
| 6,321,212 B1 | * | 11/2001 | Lange | 705/1 |

FOREIGN PATENT DOCUMENTS

WO   WO 99/06934   * 2/1999   .......... G06F/17/60

* cited by examiner

Primary Examiner—Wayne Amsbury
(74) Attorney, Agent, or Firm—Gregory M. Doudnikoff; Carstens, Yee, Cahoon, LLP

(57) ABSTRACT

A method and system for ascertaining warranty issues associated with transportation products is provided. Transportation products are manufactured at a factory, and as the products are made, historical information concerning significant events related to the manufacturing process may be stored. As the transportation product is delivered to a retail outlet, other significant event information may be stored. Locations are determined within a region for warranty claims related to the servicing of selected transportation products. Product history information for the selected transportation products may be retrieved from one or more databases. Data mining algorithms may be employed to generate input data for forming a set of spatial relationships. The locations of products within the region are then associated with the product history information to form a set of spatial relationships. Product history information may include such information as purchaser address information, information related to manufacture of the selected transportation products, information related to transportation of the selected transportation products from a manufacturing site to a retail outlet, etc.

21 Claims, 6 Drawing Sheets

METHOD AND SYSTEM FOR INTEGRATING SPATIAL ANALYSIS AND DATA MINING ANALYSIS TO ASCERTAIN WARRANTY ISSUES ASSOCIATED WITH TRANSPORTATION PRODUCTS

CROSS REFERENCE TO RELATED APPLICATIONS

The present invention is related to the following applications entitled "METHOD AND SYSTEM FOR INTEGRATING SPATIAL ANALYSIS AND DATA MINING ANALYSIS TO ASCERTAIN FAVORABLE POSITIONING OF PRODUCTS IN A RETAIL ENVIRONMENT", U.S. application Ser. No. 09/400,583; and "METHOD AND SYSTEM FOR INTEGRATING SPATIAL ANALYSIS AND DATA MINING ANALYSIS TO ASCERTAIN RELATIONSHIPS BETWEEN COLLECTED SAMPLES AND GEOLOGY WITH REMOTELY SENSED DATA", U.S. application Ser. No. 09/400,776; all of which are filed even date hereof, assigned to the same assignee, and incorporated herein by reference.

BACKGROUND OF THE INVENTION

1. Technical Field

The present invention relates to an improved data processing system and, in particular, to a method and system for a specific business application of database processing.

2. Description of Related Art

As businesses become more productive and profit margins seem to be reduced, relationships between businesses and its customers become more valuable. Businesses are more willing to protect those relationships by spending more money on information technology. Because an enterprise may collect significant amounts of data concerning their operations and the flow of goods to and from the enterprise, some of the expenditures on information technology are used to "mine" these collections of data to discover customer relationships that are useful to the enterprise.

Data mining allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

Certain businesses desire a better understanding of customers and purchased products, and data mining has been used in an attempt to discover relationships between customers and purchases. One class of relationships for which some businesses desire guidance is the relationship between failure of transportation products, such as cars, trucks, minivans, etc., and the appearance of warranty claims for the products. Business may own several databases from which such relationships could be extracted if the proper methodologies could be applied. However, data mining analysis heretofore has been concerned primarily with relationships between customer characteristics and product characteristics. However, one of the aspects of the customer-retailer relationship that is not assessed by data mining is the geographic relationship between the customer and the retailer. Spatial analysis using a Geographic Information System (GIS) is used to delineate those geographic relationships. For example, much of a relationship between a customer and retail relationship or a manufacturer and its retail distribution points can be related to the way that customer product complaints are handled. The spatial relationships between the locations of product failures and the location of their repairs cannot be assessed without the use of GIS. Therefore, if there were geographic factors that bear upon the reason for the failure, they would not be considered.

Therefore, it would be advantageous to provide a method and system for data analysis that discovers relationships between the cause for transportation product failures and the locations of other entities or events which may contribute to the cause of the product failures. These may include data such as the retail outlets at which the transportation products were purchased, the manner in which the transportation products were shipped to the retail outlets as well as the manner in which the transportation product is used and the location of the area of its primary use in comparison to the repair facility that undertakes repairs of the damaged product when it is under warranty. Much of the respective geographic relationships between these data can contribute to the validity of warranty claims that are filed against the manufacturer's warranty by the retailer who repairs the transportation product. The validity or non-validity of these claims effect the well being of the relationship between the retailer who sold and/or who repaired the damaged transportation product as well as the continued good relationship between the manufacturer, the retailer, and their ultimate transportation product customer.

SUMMARY OF THE INVENTION

A method and system for ascertaining warranty issues associated with transportation products is provided. Transportation products are manufactured at a factory, and as the products are made, historical information concerning significant events related to the manufacturing process may be stored. As the transportation product is delivered to a retail outlet, other significant event information may be stored. Locations for the repair of the products under warranty may be related to the servicing of selected transportation products as well as their use. Product history information for the selected transportation products may be retrieved from one or more databases. Data mining algorithms may be employed to generate input data into a GIS for an analysis that will allow the formulation of a set of spatial relationships.

In this process, the locations of products within a region are associated with the product history information to form a set of spatial relationships between events that have led up to the repair of the product as well as the location of that repair with respect to the original retailer selling the product. Product history information may include such information as purchaser address information, information related to manufacture of the selected transportation products, information related to transportation of the selected transportation products from a manufacturing site to a retail outlet, primary use of the transportation product, etc. To understand the validity of a warranty claim filed against the manufacturer warranty by the repairer of a damaged transportation product, one must not only consider the attributes related to the cause for the damage but the spatial relationships between those attributes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
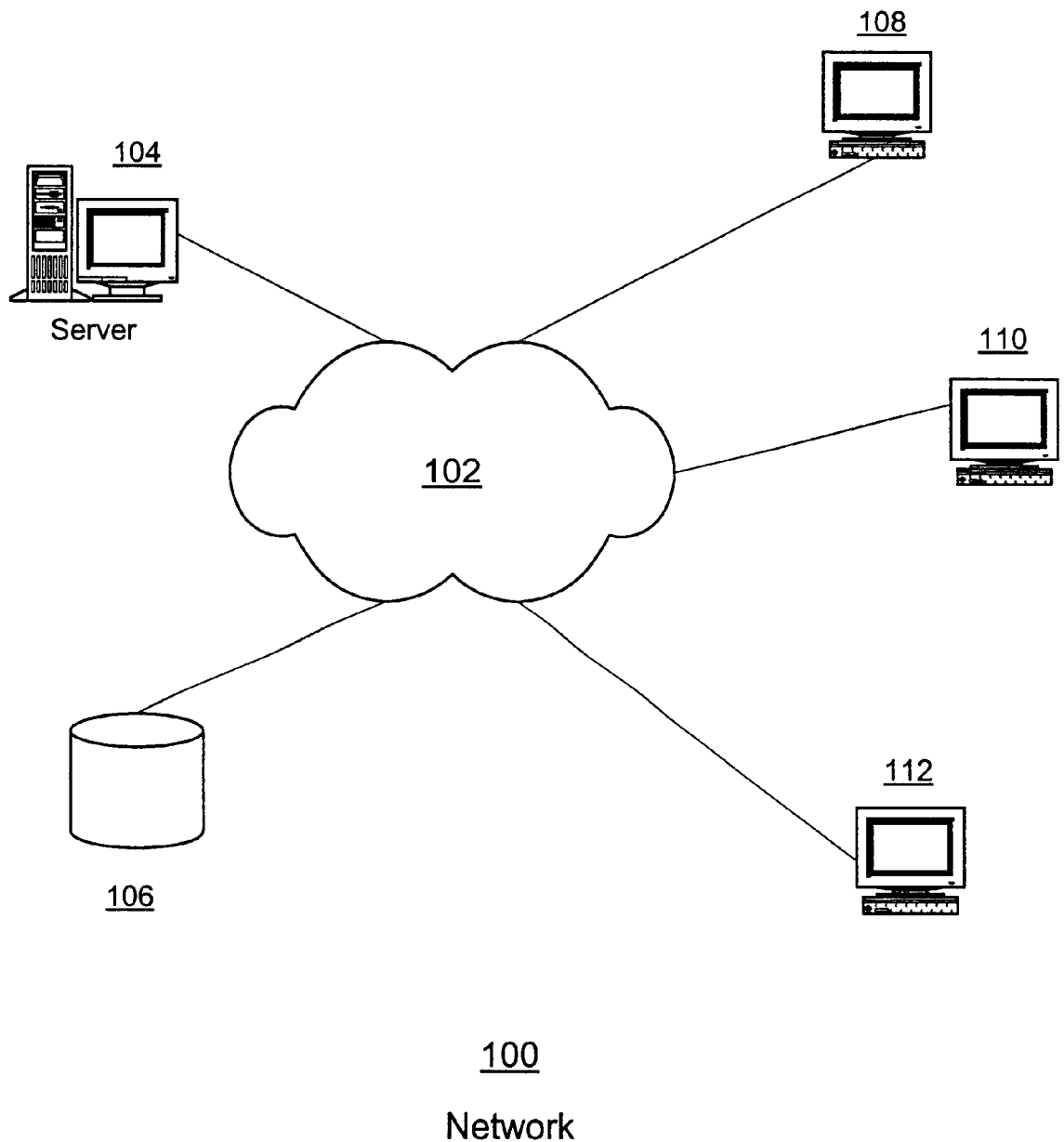
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or point-of-sale systems, such as electronic cash registers. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
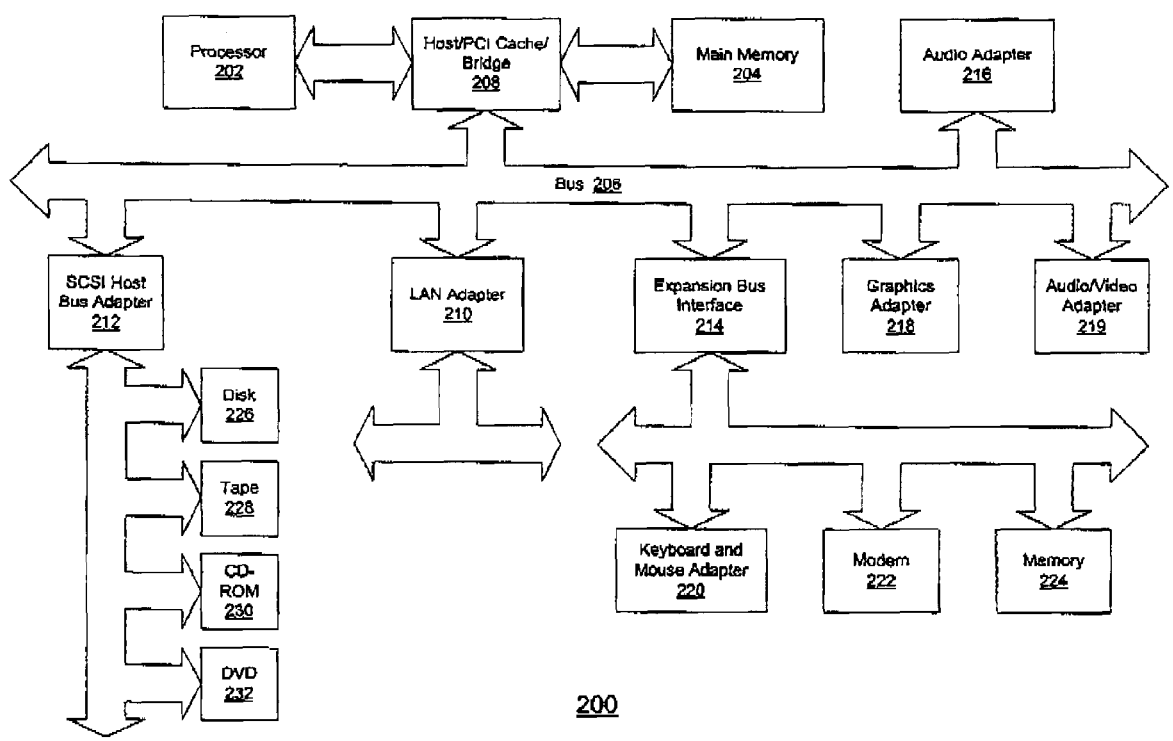
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors. An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. These peripheral devices may use operating systems that differ from those described above and may include Unix or AIX as examples. The depicted example is not meant to imply architectural limitations with respect to the present invention. For example, the processes of the present invention may be applied to multiprocessor data processing systems.

As the present invention relies extensively on the relatively new field of data mining and uses data mining algorithms without proffering a new data mining algorithm per se, a discussion of the general techniques and purposes of data mining are herein provided before a detailed discussion of the implementation of the present invention.

Background on Data Mining

Data mining is a process for extracting relationships in data stored in database systems. As is well-known, users can query a database system for low-level information, such as how many compact disks did a particular consumer purchase in the last month. Data mining systems, on the other hand, can build a set of high-level rules about a set of data, such as "If the purchaser is a student and between the ages of 16 and 21, then the probability of buying a compact disk is eighty percent." Such rules allow a manager to make queries, such as "Which customers have the highest probability of buying a compact disk?" This type of knowledge allows for targeted marketing of products and helps to guide other strategic business decisions. Applications of data mining include finance, market data analysis, medical diagnosis, scientific tasks, VLSI design, analysis of manufacturing processes, etc. Data mining involves many aspects of computing, including, but not limited to, database theory, statistical analysis, artificial intelligence, and parallel/distributed computing.

Data mining may be categorized into several tasks, such as association, classification, and clustering. There are also several knowledge discovery paradigms, such as rule induction, instance-based learning, neural networks, and genetic algorithms. Many combinations of data mining tasks and knowledge discovery paradigms are possible within a single application.

Data Mining Tasks

An association rule can be developed based on a set of data for which an attribute is determined to be either present or absent. For example, suppose data has been collected on purchases by customers at a store and the attributes are whether specific items were purchased or not for each of the transactions. The goal is to discover any association rules between the purchase of some items and the purchase of other items. Specifically, given two non-intersecting sets of items, e.g., sets X and Y, one may attempt to discover whether there is a rule "if X was purchased, then Y was purchased," and the rule is assigned a measure of support and a measure of confidence that is equal or greater than some selected minimum levels. The measure of support is the ratio of the number of records where both X and Y were purchased divided by the total number of records. The measure of confidence is the ratio of the number of records where both X and Y were purchased divided by the number of records where X was purchased. Due to the smaller set of transactions in the denominators of these ratios, the minimum acceptable confidence level is higher than the minimum acceptable support level. Returning to shopping transactions as an example, the minimum support level may be set at 0.3 and the minimum confidence level set at 0.8. An example rule in a set of grocery store transactions that meets these criteria might be "if bread was purchased, then butter was purchased."

Given a set of data and a set of criteria, the process of determining associations is completely deterministic. Since there are a large number of subsets possible for a given set of data and a large number of transactions to be processed, most research has focused on developing efficient algorithms to find all associations. However, this type of inquiry leads to the following question: Are all discovered associations really significant? Although some rules may be interesting, one finds that most rules may be uninteresting since there is no cause and effect relationship. For example, the association "if butter was purchased, then bread was purchased" would also be a reported associated with exactly the same support and confidence values as the association "if bread was purchased, then butter was purchased," even though one would assume that the purchase of butter was possibly caused by the purchase of bread and not vice versa.

Classification tries to discover rules that predict whether a record belongs to a particular class based on the values of certain attributes. In other words, given a set of attributes, one attribute is selected as the "goal," and one desires to find a set of "predicting" attributes from the remaining attributes. For example, suppose it is desired to know whether a particular item will be purchased based on the gender, country of origin, and age of the purchaser. For example, this type of rule could include "If the person is from France and over 25 years old, then they will not purchase the item." A set of data is presented to the system based on past knowledge; this data "trains" the system. The goal is to produce rules that will predict behavior for a future class of data. The main task is to design effective algorithms that discover high quality knowledge. Unlike association in which one may develop definitive measures for support and confidence, it is much more difficult to determine the quality of a discovered rule based on classification.

A problem with classification is that a rule may, in fact, be a good predictor of actual behavior but not a perfect predictor for every single instance. One way to overcome this problem is to cluster data before trying to discover classification rules. To understand clustering, consider a simple case were two attributes are considered: age and expenditures on clothes. These data points can be plotted on a two-dimensional graph. Given this plot, clustering is an attempt to discover or "invent" new classes based on groupings of similar records. For example, for the above attributes, a clustering of data in the range of $500–700 per year might be found for teenagers from 15 to 19 years old. This cluster could then be treated as a single class. Clusters of data represent subsets of data where members behave similarly but not necessarily the same as the entire population. In discovering clusters, all attributes are considered equally relevant. Assessing the quality of discovered clusters is often a subjective process. Clustering is often used for data exploration and data summarization.

Knowledge Discovery Paradigms

There are a variety of knowledge discovery paradigms, some guided by human users, e.g. rule induction and decision trees, and some based on AI techniques, e.g. neural networks. The choice of the most appropriate paradigm is often application dependent.

On-line analytical processing (OLAP) is a database-oriented paradigm that uses a multidimensional database where each of the dimensions is an independent factor, e.g., product vs. customer name vs. date. There are a variety of operators provided that are most easily understood if one assumes a three-dimensional space in which each factor is a dimension of a vector within a three-dimensional cube. One may use "pivoting" to rotate the cube to see any desired pair of dimensions. "Slicing" involves a subset of the cube by fixing the value of one dimension. "Roll-up" employs higher levels of abstraction, e.g. moving from sales-by-city to sales-by-state, and "drill-down" goes to lower levels, e.g. moving from sales-by-state to sales-by-city. The Data Cube operation computes the power set of the "Group by" operation provided by SQL. For example, given a three dimension cube with dimensions A, B, C, then Data Cube computes Group by A, Group by B, Group by C, Group by A,B, Group by A,C, Group by B,C, and Group by A,B,C. OLAP is used by human operators to discover previously undetected knowledge in the database.

Recall that classification rules involve predicting attributes and the goal attribute. Induction on classification rules involves specialization, i.e. adding a condition to the rule antecedent, and generalization, i.e. removing a condition from the antecedent. Hence, induction involves selecting what predicting attributes will be used. A decision tree is built by selecting the predicting attributes in a particular order, e.g., country of origin first, age second, gender third. The decision tree is built top-down assuming all records are present at the root and are classified by each attribute value going down the tree until the value of the goal attribute is determined. The tree is only as deep as necessary to reach the goal attribute. For example, if no one from Germany buys a particular product, then the value of the goal attribute "Buy?" would be determined (value equals "No") once the country of origin is known to be Germany. However, if the country of origin is a different value, such as France, it may be necessary to look at other predicting attributes (age, gender) to determine the value of the goal attribute. A human is often involved in selecting the order of attributes to build a decision tree based on "intuitive" knowledge of which attribute is more significant than other attributes.

Decision trees can become quite large and often require pruning, i.e. cutting off lower level subtrees. Pruning avoids "overfitting" the tree to the data and simplifies the discovered knowledge. However, pruning too aggressively can result in "underfitting" the tree to the data and missing some significant attributes.

The above techniques provide tools for a human to manipulate data until some significant knowledge is discovered. other techniques rely less on human intervention. Instance-based learning involves predicting the value of a tuple, e.g., predicting if someone of a particular age and gender will buy a product, based on stored data for known tuple values. A distance metric is used to determine the values of the N closest neighbors, and these known values are used to predict the unknown value. For example, given a particular age and gender where the tuple value is not known, if among the 20 nearest neighbors, 15 brought the product and 5 did not, then it might be predicted that the value of this new tuple would be "to buy" the product. This technique does not discover any new rules, but it does provide an explanation for the classification, namely the values of the closest neighbors.

The final technique examined is neural nets. A typical neural net includes an input layer of neurons corresponding to the predicting attributes, a hidden layer of neurons, and an output layer of neurons that are the result of the classification. For example, there may be eight input neurons corresponding to "under 25 years old", "between 25 and 45 years old", "over 45 years old", "from Britain", "from France", "from Germany", "male", and "female". There would be two output neurons: "purchased product" and "did not purchase product". A reasonable number of neurons in the middle layer is determined by experimenting with a particular known data set. There are interconnections between the neurons at adjacent layers that have numeric weights. When the network is trained, meaning that both the input and output values are known, these weights are adjusted to given the best performance for the training data. The "knowledge" is very low level (the weight values) and is distributed across the network. This means that neural nets do not provide any comprehensible explanation for their classification behavior-they simply provide a predicted result. Neural nets may take a very long time to train, even when the data is deterministic. For example, to train a neural net to recognize an exclusive-or relationship between two Boolean variables may take hundreds or thousands of training data (the four possible combinations of inputs and corresponding outputs repeated again and again) before the neural net learns the circuit correctly. However, once a neural net is trained, it is very robust and resilient to noise in the data. Neural nets have proved most useful for pattern recognition tasks, such as recognizing handwritten digits in a zip code.

Other knowledge discovery paradigms can be used, such as genetic algorithms. However, the above discussion presents the general issues in knowledge discovery. Some techniques are heavily dependent on human guidance while others are more autonomous. The selection of the best approach to knowledge discovery is heavily dependent on the particular application.

Data Warehousing

The above discussions focused on data mining tasks and knowledge discovery paradigms. There are other components to the overall knowledge discovery process.

Data warehousing is the first component of a knowledge discovery system and is the storage of raw data itself. One of the most common techniques for data warehousing is a relational database. However, other techniques are possible, such as hierarchical databases or multidimensional databases. Data is nonvolatile, i.e. read-only, and often includes historical data. The data in the warehouse needs to be "clean" and "integrated". Data is often taken from a wide variety of sources. To be clean and integrated means data is represented in a consistent, uniform fashion inside the warehouse despite differences in reporting the raw data from various sources. There also has to be data summarization in the form of a high level aggregation. For example, consider a phone number 111 222 3333 where 111 is the area code, 222 is the exchange, and 3333 is the phone number. The telephone company may want to determine if the inbound number of calls is a good predictor of the outbound number of calls. It turns out that the correlation between inbound and outbound calls increases. with the level of aggregation. In other words, at the phone number level, the correlation is weak but as the level of aggregation increases to the area code level, the correlation becomes much higher.

Data Pre-processing

After the data is read from the warehouse, it is pre-processed before being sent to the data mining system. The two pre-processing steps discussed below are attribute selection and attribute discretization.

Selecting attributes for data mining is important since a database may contain many irrelevant attributes for the purpose of data mining, and the time spent in data mining can be reduced if irrelevant attributes are removed beforehand. Of course, there is always the danger that if an attribute is labeled as irrelevant and removed, then some truly interesting knowledge involving that attribute will not be discovered.

If there are N attributes to choose between, then there are $2^N$ possible subsets of relevant attributes. Selecting the best subset is a nontrivial task. There are two common techniques for attribute selection. The filter approach is fairly simple and independent of the data mining technique being used. For each of the possible predicting attributes, a table is made with the predicting attribute values as rows, the goal attribute values as columns, and the entries in the table as the number of tuples satisfying the pairs of values. If the table is fairly uniform or symmetric, then the predicting attribute is probably irrelevant. However, if the values are asymmetric, then the predicting attribute may be significant.

The second technique for attribute selection is called a wrapper approach where attribute selection is optimized for a particular data mining algorithm. The simplest wrapper approach is Forward Sequential Selection. Each of the possible attributes is sent individually to the data mining algorithm and its accuracy rate is measured. The attribute with the highest accuracy rate is selected. Suppose attribute 3 is selected; attribute 3 is then combined in pairs with all remaining attributes, i.e., 3 and 1, 3 and 2, 3 and 4, etc., and the best performing pair of attributes is selected. This hill climbing process continues until the inclusion of a new attribute decreases the accuracy rate. This technique is relatively simple to implement, but it does not handle interaction among attributes well. An alternative approach is backward sequential selection that handles interactions better, but it is computationally much more expensive.

Discretization involves grouping data into categories. For example, age in years might to be used to group persons into categories such as minors (below 18), young adults (18 to 39), middle-agers (40–59), and senior citizens (60 or above).

Some advantages of discretization is that it reduces the time for data mining and improves the comprehensibility of the discovered knowledge. Categorization may actually be required by some mining techniques. A disadvantage of discretization is that details of the knowledge may be suppressed.

Blindly applying equal-weight discretization, such as grouping ages by 10 year cycles, may not produce very good results. It is better to find "class-driven" intervals. In other words, one looks for intervals that have uniformity within the interval and have differences between the different intervals.

Data Post-processing

The number of rules discovered by data mining may be overwhelming, and it may be necessary to reduce this number and select the most important ones to obtain any significant results. One approach is subjective or user-driven. This approach depends on a human's general impression of the application domain. For example, the human user may propose a rule such as "if the applicant has a higher salary, then the applicant has a greater chance of getting a loan". The discovered rules are then compared against this general impression to determine the most interesting rules. Often, interesting rules do not agree with general expectations. For example, although the conditions are satisfied, the conclusion is different than the general expectations. Another example is that the conclusion is correct, but there are different or unexpected conditions.

Rule affinity is a more mathematical approach to examining rules that does not depend on human impressions. The affinity between two rules in a set of rules $\{R_i\}$ is measured and given a numerical affinity value between zero and one, called $Af(R_x, R_y)$. The affinity value of a rule with itself is always one, while the affinity with a different rule is less than one. Assume that one has a quality measure for each rule in a set of rules $\{R_i\}$, called $Q(R_i)$. A rule $R_j$ is said to be suppressed by a rule $R_k$ if $Q(R_j) < Af(R_j, R_k)^* Q(R_k)$. Notice that a rule can never be suppressed by a lower quality rule since one assumes that $Af(R_j, R_k) < 1$ if $j<k$. One common measure for the affinity function is the size of the intersection between the tuple sets covered by the two rules, i.e. the larger the intersection, the greater the affinity.

Data Mining Summary

The discussion above has touched on the following aspects of knowledge processing: data warehousing, pre-processing data, data mining itself, and post-processing to obtain the most interesting and significant knowledge. With large databases, these tasks can be very computationally intensive, and efficiency becomes a major issue. Much of the research in this area focuses on the use of parallel processing. Issues involved in parallelization include how to partition the data, whether to parallelize on data or on control, how to minimize communications overhead, how to balance the load between various processors, how to automate the parallelization, how to take advantage of a parallel database system itself, etc.

Many knowledge evaluation techniques involve statistical methods or artificial intelligence or both. The quality of the knowledge discovered is highly application dependent and inherently subjective. A good knowledge discovery process should be both effective, i.e. discovers high quality knowledge, and efficient, i.e. runs quickly.

Spatial Analysis

Spatial analysis is a means by which one can integrate absolute positioning of objects in space such that a distance and direction between each can be determined. Once this determination has been made, the positions of these objects can then be mapped. There are numerous algorithms that can take advantage of this data to calculate time between various positions, preferential paths, spatial similarities and dissimilarities between related events, etc. This technology allows one to measure the frequency of certain events taking place, map those events with relationships to stationary objects such as products or facilities, monitor changes in patterns as a result of object position changes, and model alternatives of actions and processes that may cause the implementation of new paths that might be associated with a repair facility or retail establishment. The locations of events that lead to the need for repair of a product can be related to causes of damage to transportation products and then the relative positions of the original seller of the product and the repairer of the product that is submitting a claim against the warranty of the product. Similar technology has been used for a number of years by urban planners, scientists, resource managers and others to monitor and analyze environmental parameters.

Integrating Spatial Analysis and Discovery Based Data Mining Analysis to Ascertain Warranty Issues Associated with Transportation Products As noted above, corporations desire a form of data analysis that discovers relationships between the locations of failures of transportation products, such as cars, trucks, minivans, etc., and the locations of other entities or events which may contribute potential causes of the product failures, such as the retail outlets at which the transportation products were purchased and the manner in which the transportation products were shipped to the retail outlets. By taking advantage of the realization that the many databases owned by an enterprise contain spatial information, the present invention integrates spatial analysis methodologies with data mining methodologies. This integration of methodologies helps solve the problem of understanding of warranty issues related to transportation product repair by the original seller or when the original seller is not the one responsible for the repair or the submission of the warranty claim.

One may categorize warranty data using three aspects that facilitate the integration of spatial analysis methodologies with data mining methodologies. One aspect is the customer as an individual, i.e. the fact that the retail establishment or retail outlet may have a database containing personal information about the customer. For example, many automotive companies have preferred customer accounts for which a consumer may register by providing some personal information, such as age, address, occupation, etc. In return for personal information, including personal financial status, an automotive company provides a credit card with which a consumer may purchase ordinary products. The consumer receives special incentive points for using the card, and the consumer may eventually use those points towards a reduced price on the purchase of a transportation product. The automotive company receives not only the ability to aggregate information concerning the consumer's buying habits but also brand loyalty from the consumer.

The second aspect of warranty data is all of the factors or attributes that are associated with the transportation products, such as the production, delivery, and use of the transportation products. As a product is manufactured, the automotive company may track each particular product with a record of significant events during its lifetime. For example, an automobile manufacturer may track the location of parts that are placed into the automobile during its manufacture, the assembly line on which the product was made, the laborers which performed particular work on the product, the time periods during which the product was in particular stages of manufacture, etc. Each of these data items may be important to an analysis of a set of failures with respect to the initial state of the transportation product upon presentation for shipment to a retail outlet.

The delivery of the transportation product to a retailer may also be tracked for significant events, time periods, persons who helped with the delivery, and transportation vehicles associated with the delivery of the transportation product to a retail outlet, such as trains or transport trucks. Each of these data items may be important to an analysis of a set of failures with respect to the initial state of the transportation product upon presentation at a retail outlet.

Retailers may also create their own databases containing product-related information. Dealer-related information may be consequential for tracking transportation product failures to improper handling of the transportation products by personnel at the retail outlet. For example, a particular mechanic may be responsible for preparing a set of transportation products for delivery to a set of retail customers, and the mechanic may be responsible for introducing a particular problem into each of the products in the set of products. In addition, the dealer or retail outlet may track the repair history of each transportation product, which provides more data that may be related to causes of warranty issues. Each of these data items may be important to an analysis of a set of failures with respect to the initial state of the transportation product upon presentation to a consumer.

The third aspect of transportation product warranty data is the spatial relationship or location of the product with respect to the retail or manufacturing distribution point and, in addition, where the product and similar products are located with respect to each other. As transportation products are distributed within a region or across the country, each of these products is eventually purchased by a consumer. The address of the purchaser of a product is registered within one or more databases accessible or owned by a retailer or an automotive company. Hence, the general area in which the product is primarily used may be assumed to be the region near the purchaser's home address. By maintaining knowledge of the locations of its products and the manufacturing and use of those products, an automotive company may begin to establish an informational background related to use and environmental hazards that the vehicle may be exposed; this informational background provides a measure against which warranty claims may be judged as to whether the claim is within company compliance thresholds based upon its exposure to these environmental hazards.

Discovery-based data mining allows for the understanding of the products and the warranty claims that may occur. As noted above in the description of general data mining techniques, data mining alone may provide interesting relationships. For example, data mining within the service transactions of a retail outlet may reveal a rule such as certain types of warranty problems for a certain type of pickup truck are overwhelmingly reported by males in the age group 18–24. However, these males may also tend to live near a particular region, and data mining alone cannot provide further information concerning relationships between the locations in which these males may tend to drive their pickup trucks.

Spatial analysis allows for the relationship of these products with respect to retail outlets from which the products have been distributed to be understood. The relationship of these products within a region may be monitored and analyzed by identifying patterns with respect to outlets and individual products, which allows for the proper evaluation of warranty claims by consumers. Continuing with the above example, spatial analysis determines the exact locations of the homes of the purchasers of the transportation product, their relative placement to one another, their relative placement to the manufacturing location and retail outlets, etc. The use and service of products by customers may be spatially analyzed to determine spatial relationships. These spatial relationships may be integrated with the data relationships discovered through data mining to determine additional information concerning repair history of a particular product. This knowledge then provides the automotive company with the direction necessary to enhance the quality of their product and enables them to be better judges of the validity of warranty claims against that product.

By utilizing the present invention of the combination of spatial analysis and data mining, it is possible for the first time to spatially analyze warranty issues within a problem domain space. This integration of technologies allows for the accurate prediction of warranty claims that may be valid from those that may be invalid, thus allowing for a better warranty response for product failures and for more comprehensive treatment of customers.

Figure 3A:
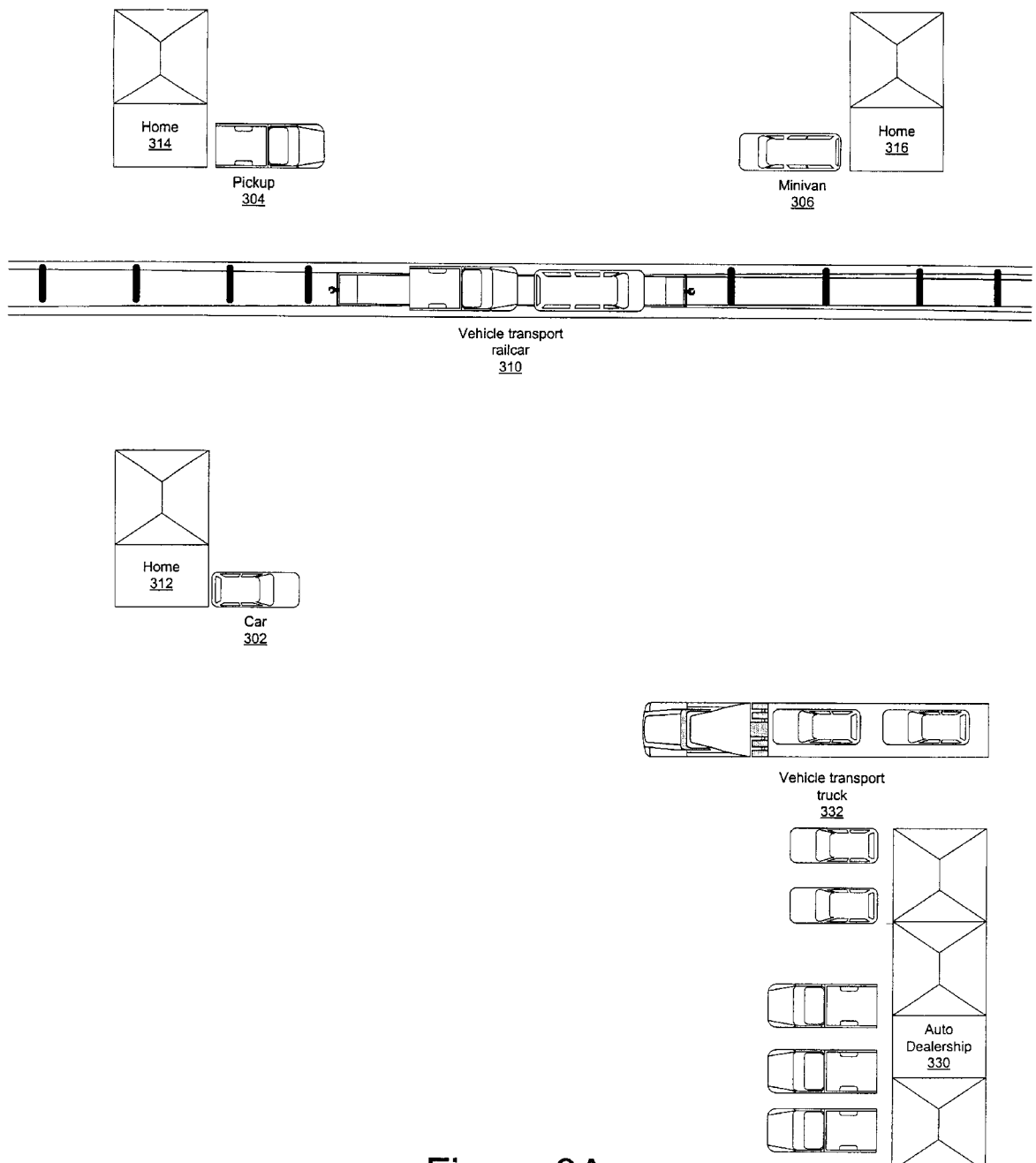
FIGS. 3A–3B are diagrams depicting overhead views of transportation products in various locations and situations which may be significant to determining warranty issues associated with the transportation products.
Figure 3B:
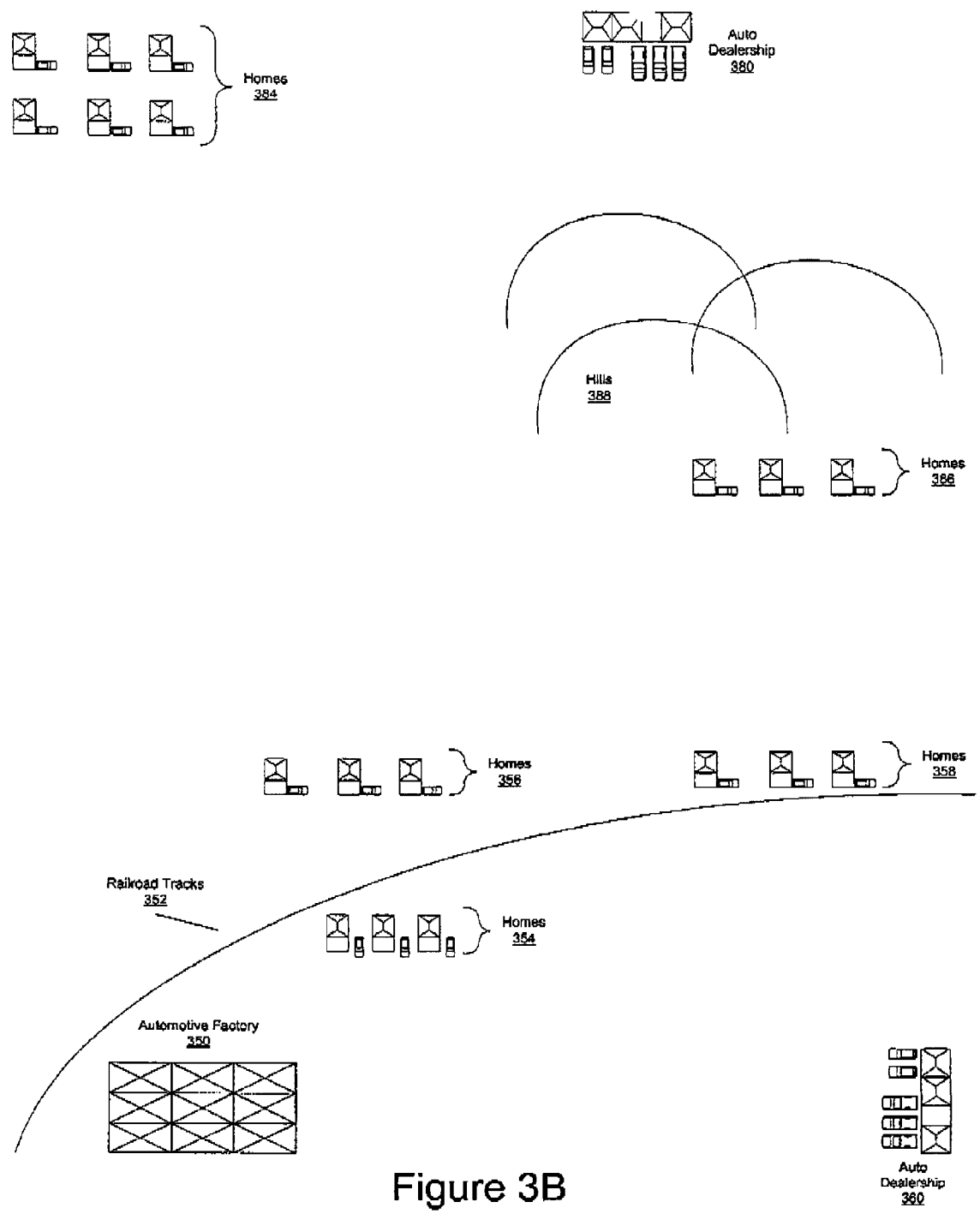

With reference to FIGS. 3A–3B, diagrams depict overhead views of transportation products in various locations and situations which may be significant to determining warranty issues associated with the transportation products.

FIG. 3A shows some transportation products near an auto dealership that may be required to perform warranty service for the transportation products. Vehicles 302–306 are located at homes 312–316, which are the homes of the purchasers of the vehicles or transportation products. During the purchase of the vehicles, the purchasers may have provided several parties with personal information for securing the purchase. The personal information would include the purchaser's address, which subsequently allows an assumption of the general area in which the vehicle operates while under warranty. One of the parties involved in the vehicle purchase is auto dealership 330, which may record the purchaser's personal information in a database within the dealership to which an automotive company has access. The dealership may later access this database to determine various information necessary for servicing the vehicle, etc. The purchaser may have also provided personal information directly to the automotive company in order to receive a special promotional discount, and in response, the automotive company may have stored this information into one of its databases.

The need for the integration provided by the present invention can be seen in the potential impact on warranties resulting from different transportation strategies used for delivery of a transportation product to a retail outlet from the factory. Vehicle transport railcar 310 is used to bring vehicles from a vehicle factory to a location near auto dealership 330. Vehicle transport truck 332 is also used to bring vehicles from the factory to the dealership.

When a vehicle is placed onto the vehicle transport railcar, various actions must be performed to get the vehicle onto the railcar and to fasten the vehicle to the railcar. These actions differ from the actions required to place the same type of vehicles on the vehicle transport truck and to fasten the vehicles to the truck. In addition, the method of transport from the factory to the dealership clearly differs, and the time in transit and the quality of care for the vehicles while in transit may also differ significantly. The identity of the vehicle transports, such as numeric identifiers for the particular vehicle transport trucks and vehicle transport railcars, may be stored in association with locations of significant events, such as the location at which the vehicles were loaded, unloaded, etc.

As an automotive company receives warranty claims, data mining analysis and spatial analysis may indicate that there is a significant relationship in warranty claims for suspension service soon after the purchase of certain transportation products for which a particular transport truck has been used to carry the transportation product to a dealership. Aspects of individual transporters as well as a combination of transport scenarios can be analyzed to identify potentially harmful transport strategies that have been used in delivering the transportation products within a certain region.

All of these aspects may be collected as data to be used for warranty analysis at some later time. Until one has a thorough understanding and assessment of the difference between a valid warranty claim and an invalid warranty claim and of the relationships hidden in potential errors in production, a thorough and fair assessment of warranty claims by a manufacturer of transportation products cannot be completed.

FIG. 3B shows some relationships between transportation products and locations within a region that may give rise to spatial relationships associated with warranty issues. As one example of the usefulness of the present invention, a transportation product that is located in a rural environment may have different characteristics associated with warranty claims than one that is located in an urban environment due to differences in the uses of the products or conditions under which they are used.

Automotive factory 352 is located near railroad tracks 354 in order to have easy access to a transportation medium for shipping its automotive products. Auto dealer 360 may receive transportation products from automotive factory 352. Consumers living in homes 354–358 may purchase transportation products from auto dealership 360 and generally return to dealership 360 for servicing of the transportation products. In addition, some consumers within this region may have purchased their vehicles from auto dealership 380 yet appear at auto dealership 360 for servicing.

In one possible situation, auto dealership 360 may present a relatively large number of warranty claims for suspension servicing of various transportation products to an automotive company which the automotive company decides to analyze. In this scenario, purchasers that live in homes 386 or homes 384 rarely have suspension problems under warranty either at auto dealership 380 or at auto dealership 360, yet auto dealership 360 performs a much larger number of suspension services under warranty than auto dealership 380.

By simply data mining various databases in order to discover relationships among the warranty claims, the automotive company may be unable to discern a pattern in the warranty claims other than relationships between purchasers and zip codes. However, through further spatial analysis, it may become clearly apparent that the warranty claims for suspension service are presented by purchasers who live in a certain subregion with respect to auto dealership 360.

Purchasers in homes 356 and homes 358 overwhelmingly have the highest number of suspension problems at auto dealership 360. By using a geographic information system (GIS) in order to obtain information concerning man-made and geographic features in the region of interest, it is possible to plot the suspected subregion with other geographically or spatially related information to discern more precise spatial relationships. By discovering that the purchasers that have suspension problems overwhelmingly live near railroad tracks 352, it may be confirmed that the roads in the city have notoriously poor railroad crossings with large potholes, etc., that may cause the suspension problems. In addition, by locating these purchasers within the GIS, it may be observed that these purchasers tend to commute to workplaces such that they are required to cross to the other side of the railroad tracks, hence ensuring that these purchasers must cross these railroad tracks frequently.

In a manner similar to discovering the source of valid warranty claims for suspension problems for purchasers near the railroad tracks, as described above, an automotive company may analyze warranty claims at auto dealership 380 for engine problems in sport utility vehicles (SUVs). Through data mining and spatial analysis, the automotive company may determine that an anomalous grouping of such claims appear to originate in purchasers that live in a subregion containing homes 386, which are geographically close to hills 388.

Upon further investigation, a warranty investigator for the automotive company may discover that groups of SUV owners are participating in weekend hill climbing races in hills 388. This type of use may place heavy burdens on the engine that sometimes damage the engine. In addition, the hill climbing races are fairly judged to be outside of normal wear and tear on a personal vehicle. Hence, the automotive company may properly refuse to pay for such warranty claims to repair vehicles that have been used in a manner which violates the warranty policy.

Without spatial analysis associated with these warranty problems, recognition of regional patterns may not be discovered. Discovery-based data mining will allow for the association and segmentation of warranty claims such that they can be classified and understood. Without the use of spatial analysis in combination with discovery-based data mining the spatial relationships of the discovery-based data mining patterns cannot be understood.

Figure 4:
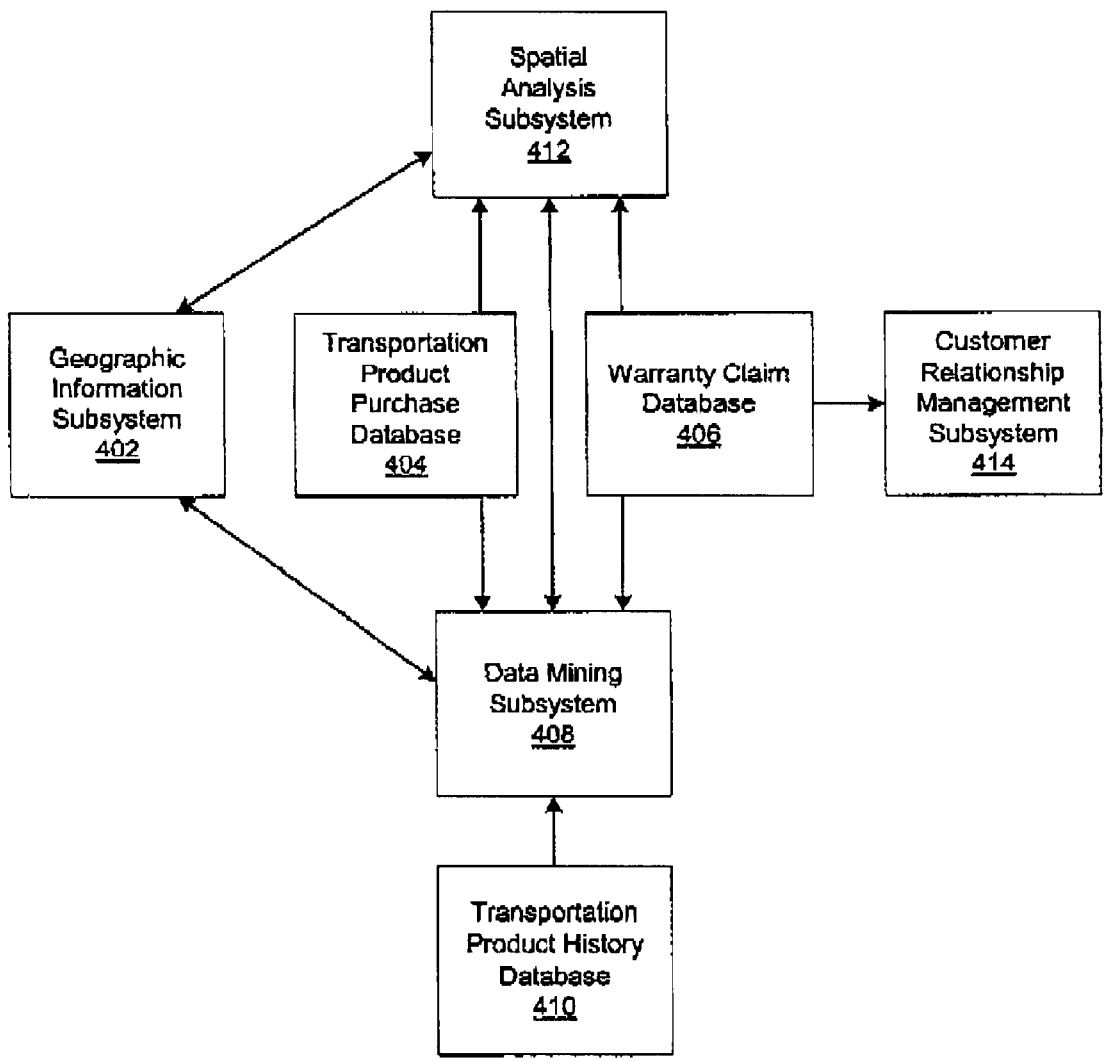
FIG. 4 is a block diagram depicting the components that may be used in a data processing system implementing the present invention.

With reference now to FIG. 4, a block diagram depicts the components that may be used in a data processing system implementing the present. invention. Geographic Information Subsystem (GIS) 402 uses map information and other geographic information to correlate, as requested by data mining subsystem 408 or spatial analysis subsystem 412, the position of the transportation products within a region as stored within transportation product purchase database 404 and the warranty claims of customers within a region as stored within warranty claim database 406. Data mining subsystem 408 uses transportation product history database 410, transportation product purchase database 404, and warranty claim database 406 to discover relationships between the transportation products, the manner in which they may be used, the locations in which they may be used, the locations of their owners, etc. Spatial analysis subsystem 412 uses the information in warranty claim database 406 and transportation product purchase database 404 to process, plot, and display spatial information.

GIS 402, data mining subsystem 408, and spatial analysis subsystem 412 transfer information as appropriate. GIS 402 may process position information as necessary for either spatial analysis subsystem 412 or data mining subsystem 408. Spatial analysis subsystem 412 receives relationship data from data mining subsystem 410 for plotting and displaying spatial relationships and may return feedback information concerning spatial relationships to data mining subsystem 408. Spatial analysis subsystem 412 and data mining subsystem 408 may provide results to customer relationship management (CRM) subsystem 414 that incorporates the results into plans for preventing the need for future warranty services.

Other databases may be provided, or the databases above may be combined in alternate arrangements of information. The examples provided above are not meant as limitations with respect to the present invention.

Figure 5:
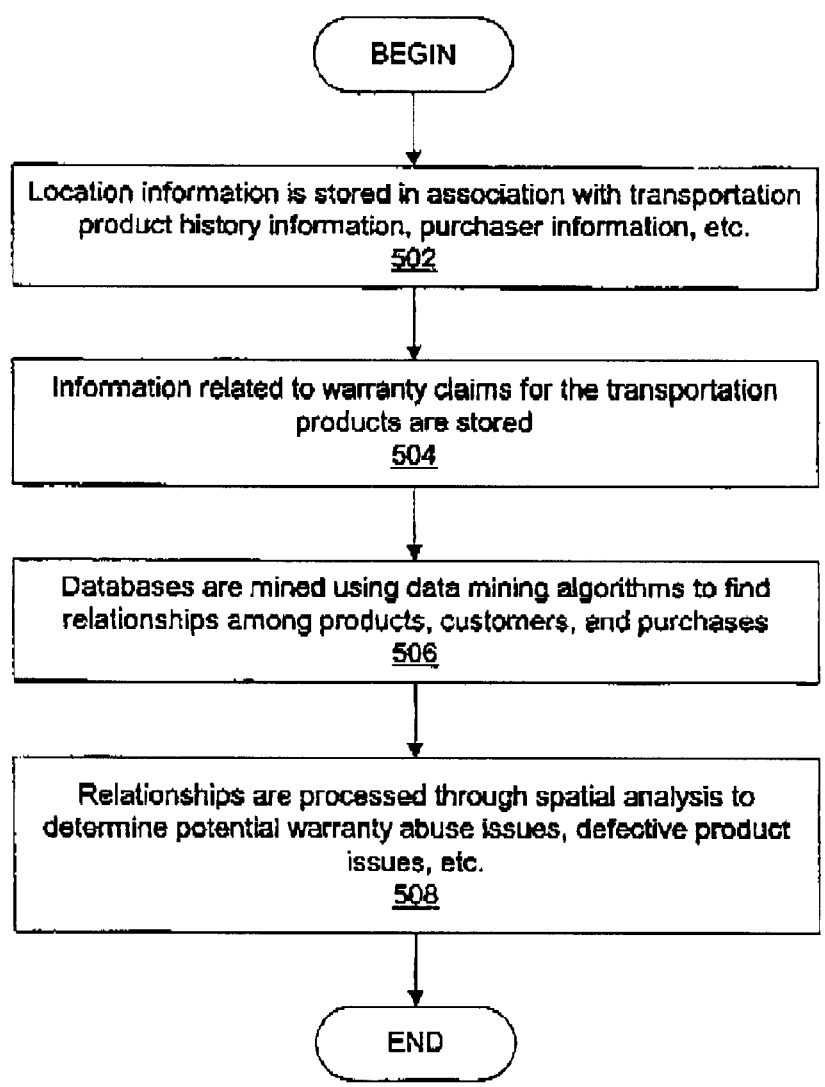
FIG. 5 is a flowchart depicting a process for integrating spatial analysis with data mining.

With reference now to FIG. 5, a flowchart depicts a process for integrating spatial analysis with data mining. The process begins with the identification and storage of potentially useful location information that is associated with various aspects of the history of the transportation products (step 502). Information related to warranty claims for the transportation products are stored within various databases, either by a retail outlet or by an automotive company (step 504). These databases are then mined using data mining algorithms to find relationships among the history of the transportation products, the uses of the transportation products, the purchasers of those products, etc. (step 506). Potentially valuable data relationships are then processed through spatial analysis to determine whether the location of products contributes or hinders particular relationships among customers and products (step 508).

The advantages of the present invention should be apparent in view of the detailed description provided above. One could conclude that the need for a tool to assess spatial relationships allows one to complete the product/warranty picture by allowing the assessment of warranty problems within the confines of where these products are located. This assessment is very difficult without plotting the product failure locations on a map and observing the resulting patterns. However, this may result in the masking of very important relationships by ones that are more bold in nature. For a complete solution that relates products to their outlets and the potential for failure, all aspects associated with that product, its use, and how it got to its ultimate destination must be analyzed. Using discovery-based data mining algorithms that address the segmentation of warranty claims into different segments (demographic clustering), the association of product parts and warranty claims to observe product failure patterns (association analysis), classification rules that predict failure of parts based upon a series of rules (binary and neural net tree analysis)., and prediction of the segments of parts and other attributes that would predict failure would be very important for the understanding of transportation product failures that result in warranty claims by owners.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for determining data relationships of data associated with warranty claims for servicing of transportation products, the method comprising the computer-implemented steps of:
   determining locations within a region for warranty claims on servicing of selected transportation products;
   retrieving product history information for the selected transportation products; and
   associating the locations of products within the region with the product history information to form a set of spatial relationships.

2. The method of claim 1 further comprising:
   employing data mining algorithms to generate input data for formulation of a set of spatial relationships using a geographic information system (GIS).

3. The method of claim 1 further comprising:
   employing spatial analysis algorithms to form the set of spatial relationships.

4. The method of claim 1 wherein the product history information includes purchaser address information.

5. The method of claim 1 wherein the product history information includes information related to manufacture of the selected transportation products.

6. The method of claim 1 wherein the product history information includes information related to transportation of the selected transportation products from a manufacturing site to a retail outlet.

7. The method of claim 1 wherein the product history information includes geographic information related to a region in which the selected transportation products are used by purchasers of the selected transportation products.

8. A data processing system for determining data relationships of data associated with warranty claims for servicing of transportation products, the data processing system comprising:
   determining means for determining locations within a region for warranty claims on servicing of selected transportation products;
   retrieving means for retrieving product history information for the selected transportation products; and
   associating means for associating the locations of products within the region with the product history information to form a set of spatial relationships.

9. The data processing system of claim 8 further comprising:
   first employing means for employing data mining algorithms to generate input data for forming the set of spatial relationships.

10. The data processing system of claim 8 further comprising:
    second employing means for employing spatial analysis algorithms to form the set of spatial relationships.

11. The data processing system of claim 8 wherein the product history information includes purchaser address information.

12. The data processing system of claim 8 wherein the product history information includes information related to manufacture of the selected transportation products.

13. The data processing system of claim 8 wherein the product history information includes information related to transportation of the selected transportation products from a manufacturing site to a retail outlet.

14. The data processing system of claim 8 wherein the product history information includes geographic information related to a region in which the selected transportation products are used by purchasers of the selected transportation products.

15. A computer program product on a computer readable medium for use in a data processing system for determining data relationships of data associated with warranty claims for servicing of transportation products, the computer program product comprising:

instructions for determining locations within a region for warranty claims on servicing of selected transportation products;

instructions for retrieving product history information for the selected transportation products; and instructions for associating the locations of products within the region with the product history information to form a set of spatial relationships.

16. The computer program product of claim 15 further comprising:

instructions for employing data mining algorithms to generate input data for forming the set of spatial relationships.

17. The computer program product of claim 15 further comprising:

instructions for employing spatial analysis algorithms to form the set of spatial relationships.

18. The computer program product of claim 15 wherein the product history information includes purchaser address information.

19. The computer program product of claim 15 wherein the product history information includes information related to manufacture of the selected transportation products.

20. The computer program product of claim 15 wherein the product history information includes information related to transportation of the selected transportation products from a manufacturing site to a retail outlet.

21. The computer program product of claim 15 wherein the product history information includes geographic information related to a region in which the selected transportation products are used by purchasers of the selected transportation products.

* * * * *